Jan. 23, 1940. J. S. JOHNSON 2,188,243
IRRIGATION SYSTEM
Filed Nov. 24, 1937 2 Sheets-Sheet 1
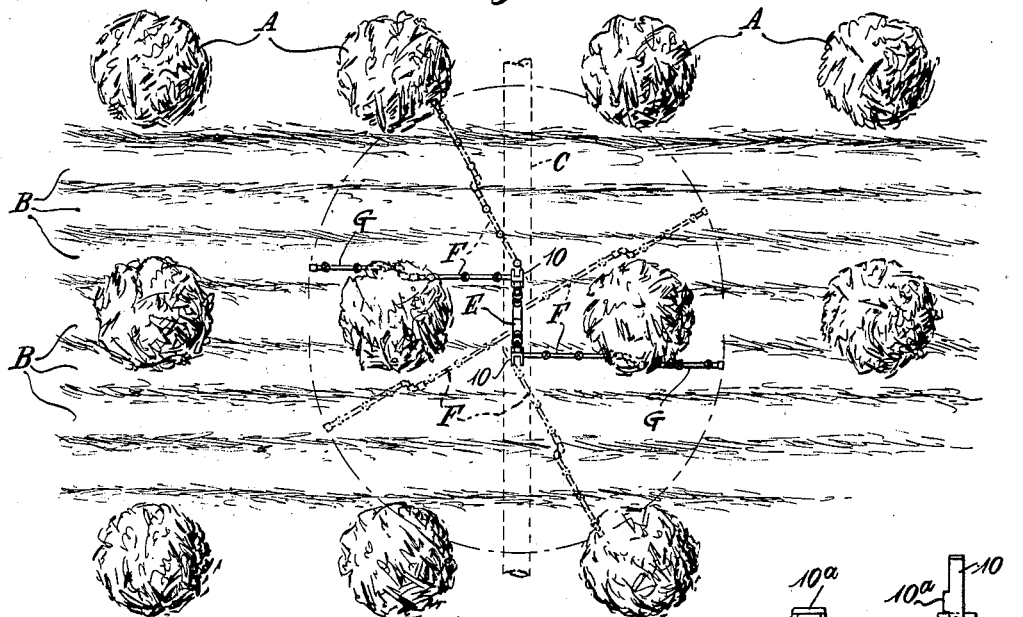
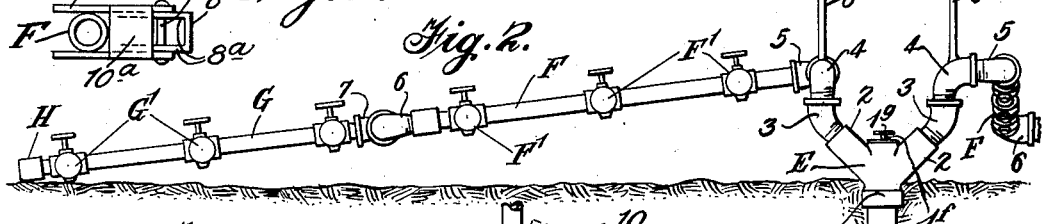
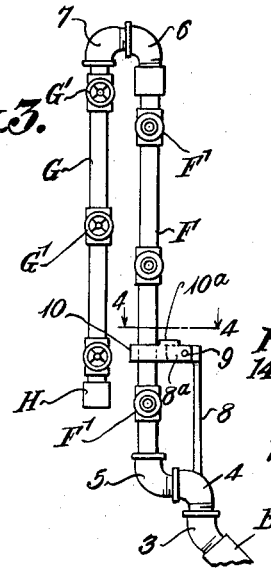
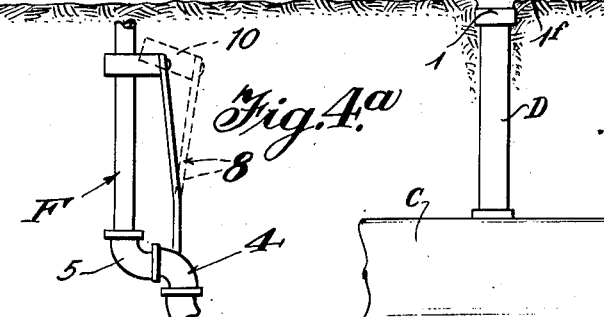
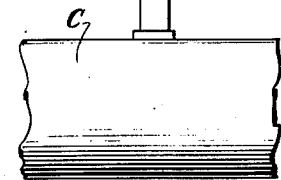

Jan. 23, 1940. J. S. JOHNSON 2,188,243
IRRIGATION SYSTEM
Filed Nov. 24, 1937 2 Sheets-Sheet 2
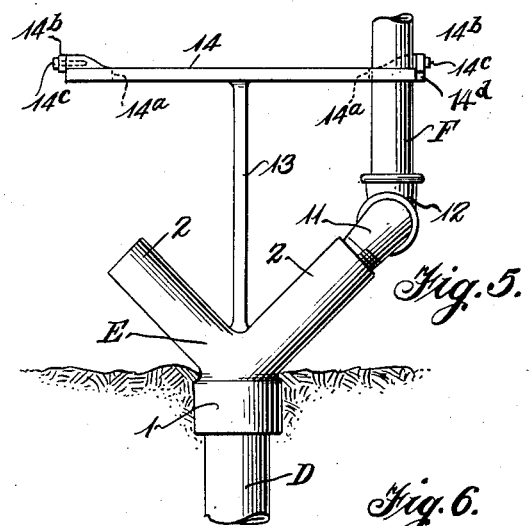
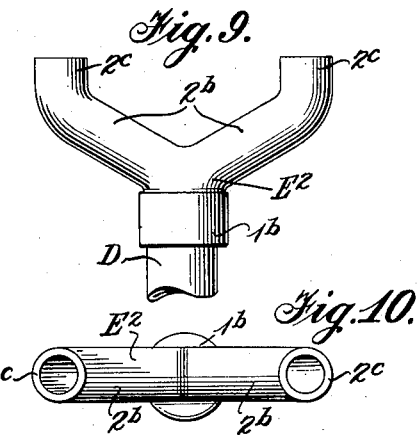
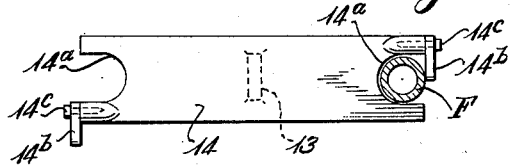
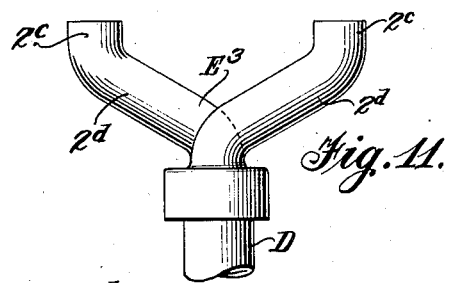
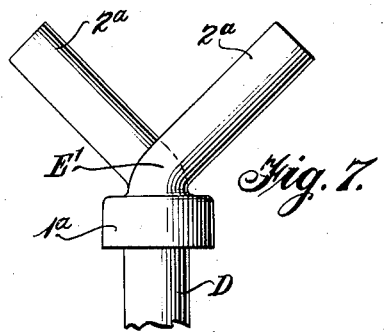
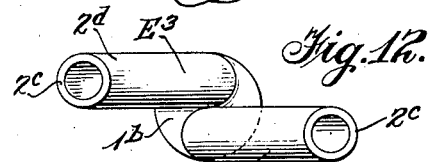
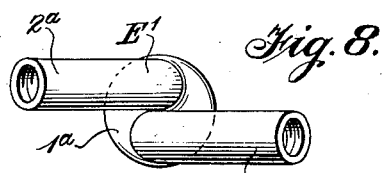
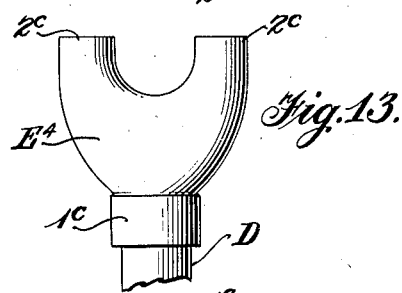
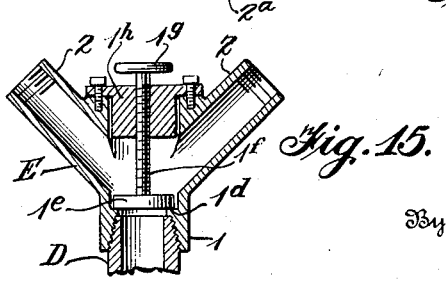
Inventor
James Stanley Johnson
By
Alexander Powell
Attorneys Patented Jan. 23, 1940

2,188,243

UNITED STATES PATENT OFFICE 2,188,243

IRRIGATION SYSTEM

James Stanley Johnson, Pasadena, Calif.

Application November 24, 1937, Serial No. 176,343

7 Claims. (Cl. 61—12)

This invention relates to irrigation systems for orchards, groves and the like, in which the latter are provided with underground pressure water mains and the ground surfaces are provided with parallel irrigation furrows running throughout same, the system including standpipes connected with the water mains at desired intervals projecting above the ground surface, each standpipe being provided with a pair of swingable water discharge arms having series of valved outlets therein, whereby the arms of each pair may be adjusted to any angularity with respect to furrows to embrace any number of furrows at both sides of the standpipe within the limits of length of the arms to discharge water into any or all of the furrows embraced, whereby a minimum number of standpipes may be placed so as to properly feed water into all the furrows. Irrigation systems of the above general type have heretofore been used, same possessing marked advantages over prior systems using only a single standpipe to which the various furrows radiate, since not only considerable labor is saved in making the furrows themselves, but also use of such systems permits maintenance of a much closer control of the water.

In systems of the above general type, in present use, the arms are pivotally connected to a T-fitting attached to the top of the standpipe, the T-fitting comprising a casting having a valve and two horizontal and diametrically disposed outlets. Secured in each of these horizontal outlets is a pipe L in which a second pipe L is threaded or rotatably fitted, the movable arm being threaded into the outer end of the second pipe L; and thus the pipe L's permit movement of the arm in two directions, or in a combination thereof. One disadvantage of such arrangement of pipe L's is that when the movable arms are in a position parallel with the fixed outlets binding occurs. At such point the arm is extended straight out in a horizontal position in alignment with the axis of the pipe L carried directly by the T-fitting, and free movement of the arm is permitted in only one plane. It is correspondingly prevented in the other plane at 90° to the one in which it is permitted. In practice, movement is generally prevented in a vertical direction when the arm is extended straight out in a horizontal direction. Consequently, the weight of the arm is supported entirely by the pipe L itself, and if any additional load is accidentally imposed on the arm, such load is concentrated on the L and there is great likelihood of breakage. The arms in practice often get in this binding position accidentally during service, and trouble is encountered.

I have found that by changing the design of the T-fitting on the standpipe, so that the outlets thereof are not disposed in a horizontal plane but are upwardly inclined, such binding is practically impossible even when the movable arms are disposed horizontally, because such binding can occur only when the movable arms and the axes of the outlets of the standpipe fittings are parallel. One object, therefore, of my invention is to provide said standpipes with Y-fittings, instead of T-fittings, in which the axes of the outlets diverge outwardly and upwardly in opposite directions, same being likewise provided with pairs of pipe L's or other swivel devices to allow the arms to move about it in two planes or combinations thereof so that any binding that may occur will only be experienced when the arms are disposed at about 45° from the vertical, which binding at such angle is relatively unobjectionable; and moreover use of such Y-fittings will permit water to drain back more readily from the arms and L-fittings into the standpipes when the system is not in use, thus minimizing corrosion in the various fittings.

Another object of the invention is to provide Y-fittings of the above type in which the axes of the two branches carrying the outlets are not disposed in the same plane, but in parallel planes offset from each other, this arrangement similarly rendering any binding in a vertical position of the arms unobjectionable.

A still further object is to provide such Y-fittings with fixed outlets each directed vertically upwardly or in which the Y-fittings and the lower pipe L's are combined as a single unit having the fixed vertical outlets upon which the arms may swing in a horizontal plane, the arms being further connected to such modified fitting by a swivel connection permitting movement also in a vertical plane.

Heretofore all of swinging or movable arms that have been used in such systems have been rigid and continuous throughout their entire length, the arms often being ten or more feet in length, and therefore being cumbersome and unsightly in the orchard or grove when not in use.

A still further object of my invention is to provide means for shortening the arms when not in use by providing a separable joint which could be merely a threaded connection at some point near their centers, so that the arms may be disassembled; or to provide swivel joints near the arm centers so that the arms may be foreshortened by folding when not in use. These arms may be made in two or more sections, with disassembling means or swivel joints.

It has been found unsatisfactory to move such irrigating assemblies from one point to another and thus same have heretofore been permanent installations, and when not in use the arms have either been leaned against a tree or supported by a post necessarily provided for such purpose. The arms if leaned against a tree do damage thereto by knocking off fruit and foliage, and injure small branches, and if the arms are leaned against a post, such post must not only be provided but also means for fastening the arms to the post, all of which is an added expense, is rather fussy and cumbersome, and does not make as permanent and neat an installation as might be desired since such posts become loose, or rot, and are often in the path of agricultural equipment. It is highly desirable to have the arms self-supported when not in use.

A still further object of my invention is to provide means on the Y-fittings or L-fittings or other fittings in the form of supports having latches or catches similar to those used for gates in metal fences, to hold the arms in upright position when not in use, preventing same from swinging in the vertical plane. When the supports are mounted on the pipe L, the arm may rotate therewith in a horizontal plane so that regardless of the angularity of the arm in a horizontal plane same may be directly raised to a vertical position and latched in such position, which operation is simple and obviates the necessity heretofore encountered of resting the arms on trees or fastening them to posts. Thus the combination of the arm or jointed arm with the supporting means above described for fastening the arm in a vertical position on the fittings themselves, is of decided practical advantage. A support on the base may also be used when the arms are free to swing in one plane or a combination of planes.

I will explain the invention with reference to the accompanying drawings which illustrate several practical embodiments thereof to enable others familiar with the art to adopt and use the same; and will summarize in the claims the essential features of the invention, the novel features of construction, and novel combinations of parts, for which protection is desired.

In said drawings:

Fig. 1 shows diagrammatically an orchard or grove having parallel rows of trees, and parallel rows of irrigating furrows in its surface, and showing in dotted lines a water main, and one of my novel irrigating devices associated with the main, the pair of swinging arms thereof being shown in various angular positions with respect to the furrows.

Fig. 2 is an enlarged vertical section adjacent the irrigating device, showing the pair of swinging arms in operative positions substantially at right angles to each other.

Fig. 3 is an elevation showing one swinging arm in Fig. 2 latched in vertical inoperative position, the same being held in such position by one form of novel locking means carried by the pipe L.

Fig. 4 is an enlarged section on the line 4—4, Fig. 3.

Fig. 4a is an elevation showing a modification of the locking means for holding the swinging arm in vertical inoperative position.

Fig. 5 is an elevation showing a modified swivel connection and a modified means on the Y-fitting for latching the arms in vertical position.

Fig. 6 is a top plan view of the device shown in Fig. 5.

Fig. 6a is an end view of the device shown in Fig. 6.

Fig. 7 is an elevation of a further modified form of Y-fitting applied to the standpipe, in which the axes of the outlets of the fitting, instead of being disposed in the same plane, are disposed in parallel spaced planes.

Fig. 8 is a top plan view of the fitting shown in Fig. 7.

Figs. 9, 11 and 13 are elevations showing a still further modified Y-fitting in which the outer ends of the outlets are turned upwardly so that the axes of both outlets are vertical.

Figs. 10, 12 and 14 are top plan views respectively of the fittings shown in Figs. 9, 11 and 13.

Fig. 15 is a vertical section through a further modified Y-fitting embodying a valve in its base common to both outlet branches for controlling the flow of water.

My novel irrigation device is illustrated in connection with an orchard or grove in Fig. 1, having parallel rows of trees or plants A, the ground surface being provided with parallel furrows B for receiving water. The furrows as shown run parallel with the rows of trees A but may however be arranged to suit the topography of the land. Extending beneath the ground surface at required intervals are water mains, one of which is indicated at C in Figs. 1 and 2, having at spaced intervals standpipes D, one being shown in Fig. 2 as terminating adjacent the ground level. At the upper end of, or forming a part of each standpipe D is a novel Y-fitting E having a pair of outlet branches to which novel swinging arms F—G are connected by swivel joints permitting the arms to swivel about two intersecting planes, or combinations thereof.

In Figs. 1 to 3 each Y-fitting E is shown as having its lower end 1 connected with the upper end of standpipe D, preferably by threaded engagement, said fitting having outlet branches 2 with axes disposed in the same vertical plane, said branches being inclined upwardly and outwardly in opposite directions. In the outer end of each branch 2 is fixedly mounted a pipe L 3 whose outlet is vertically disposed, and cooperating with pipe L 3 is a rotatable pipe L 4 whose outlet is horizontally disposed, whereby the L 4 may rotate in a horizontal plane on the L 3. Rotatably mounted in the outlet of pipe L 4 is a pipe L 5 to which the swinging arms F are directly connected. By the above arrangement of swivel connections each arm F may be swung on its Y-fitting E about a horizontal axis and also about a vertical axis, thereby substantially permitting universal movement to the arms F, and permitting the arms to be swung vertically from one side of the Y-fitting to the other to avoid fixed objects which might prevent the arms from being thus positioned by swinging movement in a horizontal plane.

In the outer end of each arm F there may be fixedly mounted a pipe L 6 having a horizontally disposed outlet in which is rotatably mounted a pipe L 7 carrying an arm extension member G similar to but of somewhat shorter length than the member F, whereby when the arm F is swung into vertical position as shown in Fig. 3 the member G may hang down idly beside arm F but its lower end disposed above the ground level. Arms F and G may be of any desired combined length. While I have described pipe L's 4, 5, 6, 7 as forming the swivel joints may be obviously any other desired swivel joints may be used which will operate in the manner above described.

The outer end of extension G is closed by a cap H, and in each of the arms F and G are arranged a series of valved outlets F' and G' of any desired construction, which may be individually opened when the arm is lowered and adjusted in desired position across the furrows B to permit water to flow from main C, through standpipe D, Y-fitting E and through either or both pairs of arms F and G into specified furrows.

The use of the swivel connection 6—7 in place of arms which are rigid and continuous throughout their entire length, presents the advantage that the arms F—G may be disassembled at some point within the middle two thirds or adjacent the center of the overall length of the extended arms, and the outer arm section G entirely removed and stored, and a cap, such as H, or other closure applied to the outer end of arm F. The use of the swivel connection 6—7 moreover permits the arms to be folded and thus foreshortened, thereby enhancing convenience in locking the arms in vertical inoperative position. When not in use the arms, in my device, do not either have to be leaned against a tree or tied to a post, for I provide means on the device for supporting the arms F in vertical position when arms G have been disassembled therefrom, or for supporting the combined arms F and G in vertical position when same have been conveniently folded into parallel relation, and thereby materially shortened with respect to their overall length, thus enhancing the appearance of the device when assembled in an orchard.

As shown in Figs. 2, 3 and 4 I may provide an upstanding support 8 upon the top of each rotatable pipe L 4, said support 8 having at its upper end spaced lugs 8a which are perforated to receive a bolt 9 upon which is pivoted a bifurcated locking member 10 adapted to embrace the arm F. Member 10 may have a portion 10a adapted when in locking position to engage the lugs 8a and maintain locking member 10 in horizontal position. Thus when the parts are in the position shown in Fig. 3 and it is desired to lower the arms F—G, which can swing only in a plane parallel with the support 8 due to the fact that same are carried solely by the pipe L 5, it is only necessary to swing the locking member 10 upwardly on bolt 9 until the bifurcations clear the arm F, after which the arm may be swung downwardly. Instead of using a pivoted locking member 10 same may be fixedly carried by support 8x which latter may comprise a spring member (Fig. 4a) normally in position to maintain locking member 10 engaged with pipe F, said member being adapted to be flexed away from the pipe F as indicated in dotted lines, Fig. 4a, sufficiently to clear the latter during locking or unlocking operations, the member 8x being inflexible in a direction at right angles to such permitted flexing movement. As the members 8, 8x and the arm F are both supported upon the pipe L 4, the L 4 may be swung into any angularity in a horizontal plane without affecting the relation between the locking member 10 and arm F. The above described locking device will operate only when the axis of the stationary outlets of Y-fitting 3 are vertically disposed but regardless of the angle of the outlets it is possible to attach a fixture to the stationary Y-fitting, or to another stationary member of the system, which could be used to support the arms in substantially vertical position. Such a fixture is shown in Figs. 5 and 6.

In Figs. 5 and 6 the Y-fitting E is shown mounted upon the top of standpipe D but, instead of the stationary pipe L 3 (shown in Fig. 2) having the vertically disposed outlet fitted in the end of each branch, a rotatable pipe L 11 is shown in one branch 2 having an outlet disposed on a horizontal axis and into the end of L 11 is rotatably mounted a pipe L 12 to which arm F is directly connected. In this construction the arm F may rotate in a vertical plane due to the swivel connection between the pipe L's 11 and 12 and may rotate in the plane of the outer end of branch 2 of Y-fitting E since the pipe L 11 is rotatably mounted in said branch, the plane of the outer end of the branch being shown as inclined to the horizontal.

This arrangement of the swivels is not objectionable for it is impossible for a bind to occur except when the movable arms F and outlets are parallel, and such bind would come only when the arm is at an angle of about 45° from the vertical, and is therefore relatively unobjectionable. When using this type of Y-fitting, in which one of the swivels is not disposed in a horizontal plane, it is necessary to use a modified type of locking device for holding the folded arms F—G in vertical position. In Figs. 5, 6 and 6a the modified device comprises a vertical support 13 rigidly secured to the Y-fitting E adjacent the crotch, and having a T-head 14 having recesses 14a in each end adapted to receive the pipe F when swung upwardly into vertical position. A catch 14b is provided pivoted upon bolt 14c or the like passing through the catch and into the end of the head 14 whereby the catch may be swung upwardly into vertical position to permit pipe F to enter and leave the recess 14a; but when entered within the recess the catch will prevent the arm F from falling out of the same. A lug 14d below catch 14b normally holds the catch in horizontal position.

The Y-fitting may be somewhat modified as shown in Figs. 7 and 8, so that in the fitting E' the branches 2a, instead of having their axis disposed in the same vertical plane, have their axis disposed in spaced parallel planes as shown more particularly in Fig. 8, the branches 2a being mounted upon a common base 1a.

Figs. 9 to 14 show modifications of the Y-fitting in which the fitting E2 (Figs. 9–10) is provided with a base 1b and outlet branches 2b having as an integral part upwardly directed outer ends 2c whereby the outlets of the branches are disposed vertically, the outlets 2c corresponding with the fixed pipe L's 3 of Figs. 2 and 3. In Figs. 11 and 12 Y-fitting E3 is similar to that shown in Figs. 9 and 10 except that the two branches 2d are offset with their axes in parallel spaced planes, the same being mounted upon a common base 1b, and the outer ends of the branches 2d being upwardly turned as at 2c. In Figs. 13 and 14 the Y-fitting E4 comprises a casting having a base 1c similar to base 1b of Figs. 9 to 12, the casting being bifurcated and having a pair of spaced vertically disposed outlets 2c as in Figs. 9 to 12. Various other forms of Y-fittings may be used.

In Fig. 15 a modification of the Y-fitting E is illustrated, in which the base 1 is provided with a valve seat 1d having a valve 1e carried by a rod 1f extending upwardly through a bore in a removable plate 1h closing an opening in the crotch of the Y-fitting of sufficient size to permit assembly of the valve, said rod being provided with a handle 1g on its upper end whereby when the valve 1e is seated the water supply to both branches 2 will be cut off.

I claim:

1. In an irrigation system, a water main, a stand pipe connected therewith having a pair of outlets disposed above the ground level; a swingable water distributing pipe on each said outlet connected thereto by universal joints comprising a pair of swivel joints between each of the pipes and their respective outlets, the planes of movements of the joints of each pair intersecting, and the plane of movement of the outermost joint of each pair being vertical; and means for controlling the flow of water from said orifices.

2. In an irrigation system, a water main, a stand pipe connected therewith having a pair of outlets disposed above the ground level; a swingable water distributing pipe on each said outlet connected thereto by universal joints comprising a pair of swivel joints between each of the pipes and their respective outlets, the planes of movements of the joints of each pair intersecting, and the plane of movement of the outermost joint of each pair being vertical; means for controlling the flow of water from said orifices; and means on the system for locking and maintaining the pipes in vertical position when not in use.

3. A device for irrigation systems, comprising a Y-shaped base; and a pair of swingable water distributing pipes connected to the branches of the base by universal joints comprising a pair of swivel joints between each of the pipes and their respective outlets, the planes of movements of the joints of each pair intersecting, and the plane of movement of the outermost joint of each pair being vertical.

4. A device for irrigation systems comprising a bifurcated base; a pair of swingable water distributing pipes connected to the branches of the base by universal joints comprising a pair of swivel joints between each of the pipes and their respective outlets, the planes of movements of the joints of each pair intersecting, and the plane of movement of the outermost joint of each pair being vertical; and means on the base for locking and maintaining the pipes substantially parallel with the axis of the base.

5. In a device as set forth in claim 4, said locking means comprising a support on one member of each universal joint; and latch means on the support adapted to engage the pipe when in vertical position.

6. In a device as set forth in claim 4, said locking means comprising a flexible support on one member of each universal joint adapted to be flexed towards or from the pipe while being inflexible in a direction at right angles thereto; and latch means on the support adapted to normally engage the pipe when in vertical position.

7. In a device as set forth in claim 4, said locking means comprising a fixed support on one member of each universal joint; and a recessed locking member pivotally mounted on the support and adapted to embrace the pipe when raised into vertical position.

JAMES STANLEY JOHNSON.